June 6, 1933.   W. E. GILBERT   1,912,768
BORE HOLE SURVEY DEVICE
Filed Aug. 8, 1927    4 Sheets-Sheet 1
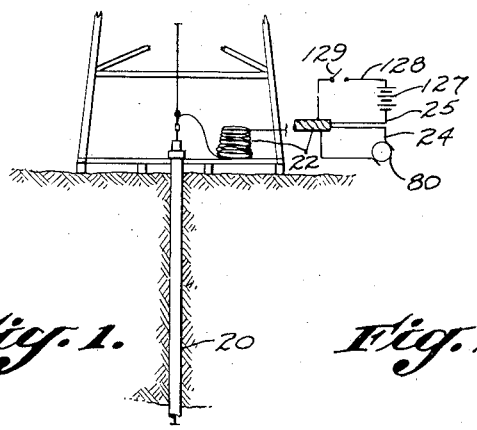
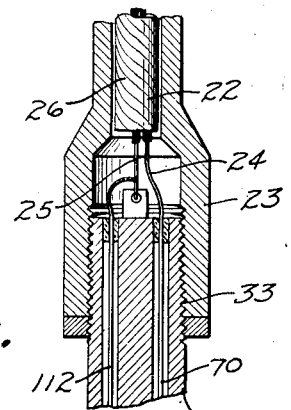
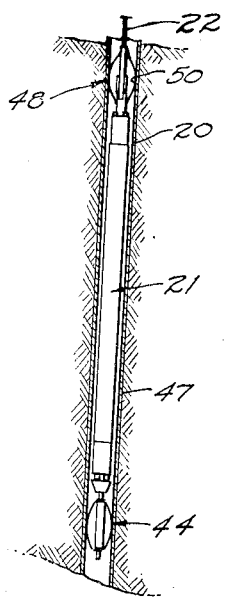
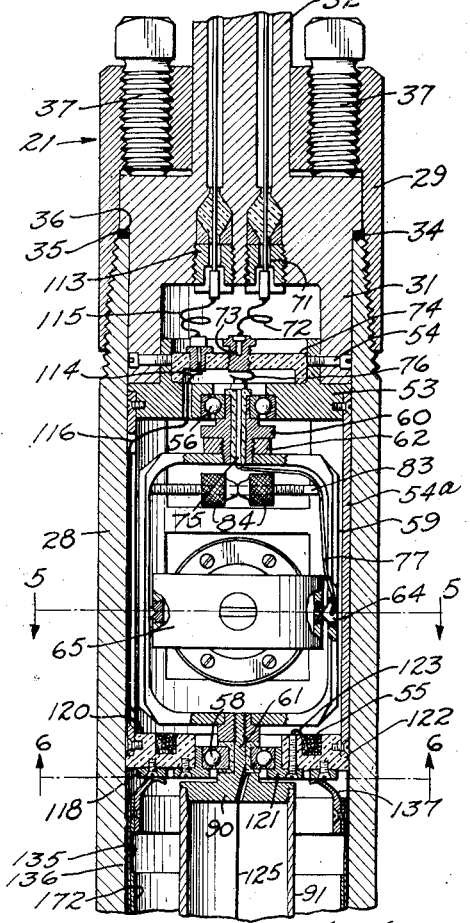

June 6, 1933. W. E. GILBERT 1,912,768
BORE HOLE SURVEY DEVICE
Filed Aug. 8, 1927 4 Sheets-Sheet 2

INVENTOR.
WALTON E. GILBERT
BY Fak W Lewis
ATTORNEY.

June 6, 1933.  W. E. GILBERT  1,912,768
BORE HOLE SURVEY DEVICE
Filed Aug. 8, 1927  4 Sheets-Sheet 3
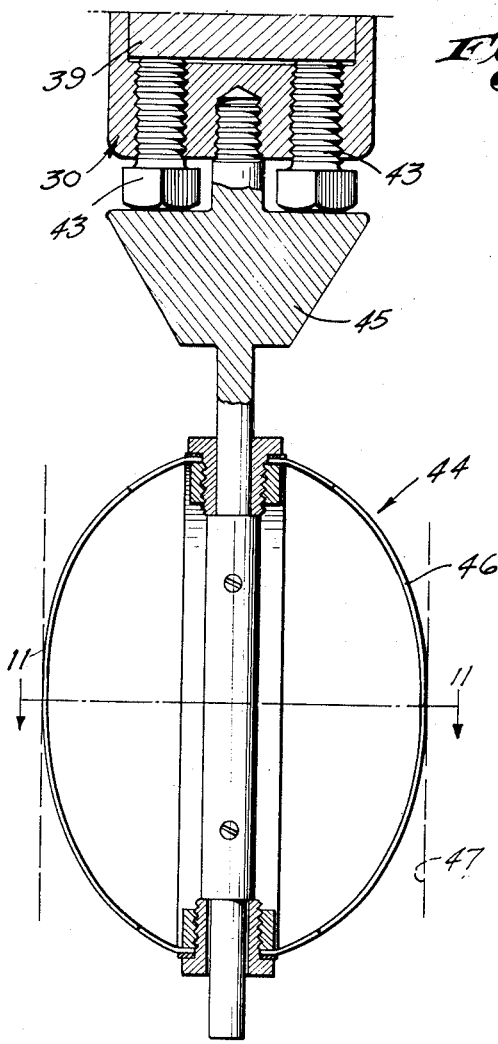
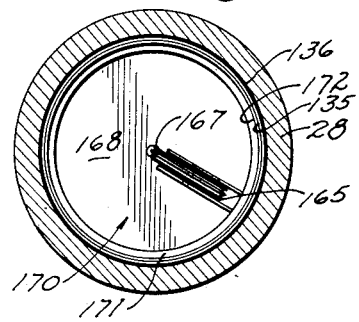
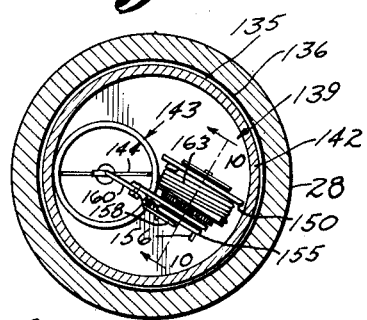
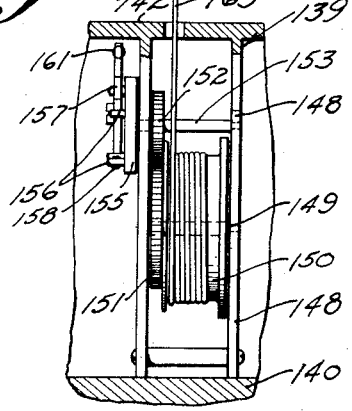
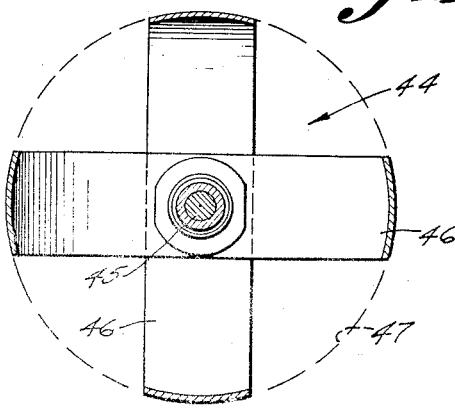
INVENTOR:
WALTON E. GILBERT,
BY Fad A Laurie
ATTORNEY.

June 6, 1933.  W. E. GILBERT  1,912,768
BORE HOLE SURVEY DEVICE
Filed Aug. 8, 1927  4 Sheets-Sheet 4
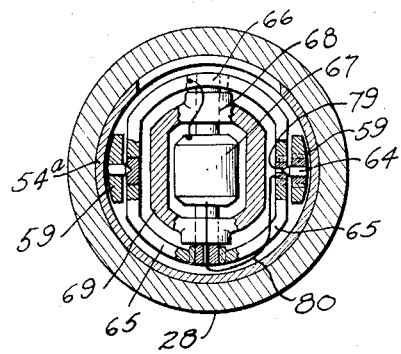
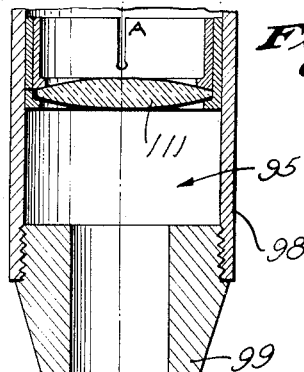
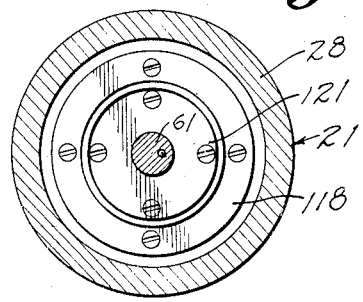
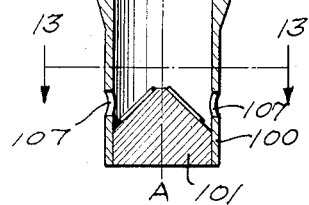
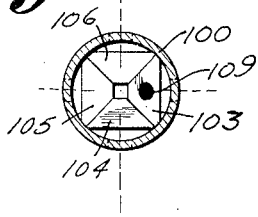
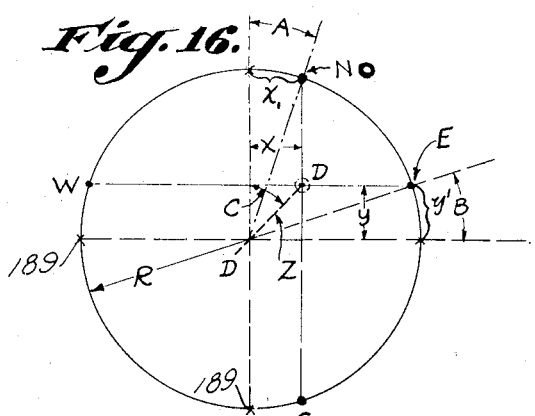
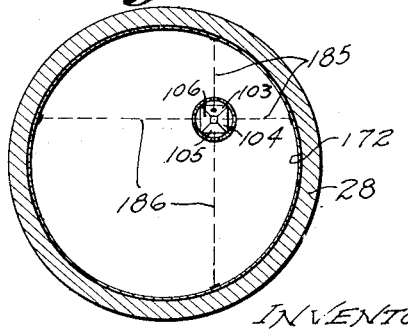
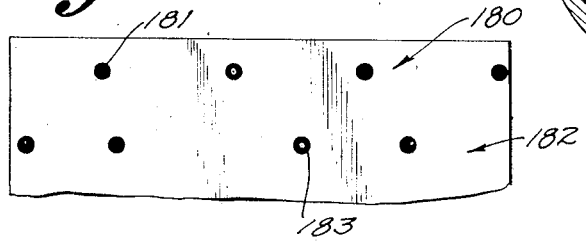
INVENTOR
WALTON E. GILBERT
BY
ATTORNEY.

Patented June 6, 1933

1,912,768

UNITED STATES PATENT OFFICE

WALTON E. GILBERT, OF PASADENA, CALIFORNIA, ASSIGNOR TO SHELL OIL COMPANY, OF SAN FRANCISCO, CALIFORNIA, A CORPORATION OF CALIFORNIA

BORE HOLE SURVEY DEVICE

Application filed August 8, 1927. Serial No. 211,409.

As is well known to those familiar with petroleum exploration, it is impossible with existing equipment to drill a bore hole which does not deviate from the vertical. These deviations, or angular changes in the course of the bore hole, are due in some instances to the side-tracking of tools or pipe lost in the hole, and are presumably due in other instances to bending of the drilling stem within the hole, and to the lack of homogeneity of the material penetrated. It will thus be seen that the depth to which it will be necessary to drill, and the possibility of completing a producing well, in a restricted oil producing area, can often be gauged by an accurate survey of the course of the bore hole. Such a survey is also essential to an intelligent study of underground strata as indicated by core samples. The purpose of the present invention is to provide a bore hole surveying instrument which will record the direction and amount of inclination of a well, and which is of improved accuracy and simplicity, and sufficiently rugged to withstand the high pressures and temperatures encountered in American drilling practice.

An important element of any bore hole surveying instrument is the means employed to maintain a fixed azimuth or direction at the instrument, from which the direction of inclination of the bore hole is measured. After careful consideration in the light of actual tests, the compass has been eliminated as unreliable for this purpose due to the existence in many cases of local attractions which cannot be satisfactorily compensated for in the material surrounding the bore hole. The method of lowering the instrument at the end of a string of pipe which is kept from turning at the surface, has also been eliminated since there is no known method of preventing the lower end of the string of pipe from twisting under the interaction of internal stresses in the pipe with the load due to its own weight, and superimposed bending stresses due to the pipe's conforming to angular deflections of the bore hole. For these reasons the gyroscope has been selected as the only thoroughly dependable means of maintaining a fixed direction within the instrument, and is thus shown in the preferred form of this invention.

It is an object of my invention to provide a bore hole survey device in which the recording apparatus has a fixed azimuth.

It is a further object of the invention to provide a bore hole survey device in which the amount and direction of inclination of the bore hole at a particular point is recorded by reflected light rays.

My invention comprehends the use of a pendulum which has a fixed azimuth, the azimuth being fixed by use of a suitable means such as a gyroscope. This pendulum includes a source of light and includes mirrors for reflecting the light rays outward onto a film. The light rays form a record on the film each time the light source is illuminated.

It is an object of this invention to provide a bore hole survey device in which the light sensitive member is automatically moved for successive readings.

It is a still further object of the invention to provide a bore hole survey device which is sealed against fluid pressures.

Other objects and advantages of importance will be pointed out in the following description.

The invention may be best understood by reference to the accompanying drawings in which:

Fig. 1 is a diagrammatic view illustrating the utility of the invention.

Fig. 2 is an enlarged vertical section of the upper part of the apparatus.

Fig. 4 is a section on the same scale as Figs. 2 and 3 showing the lower part of the apparatus.

Fig. 5 is a section taken on the line 5—5 of Fig. 2.

Fig. 6 is a section taken on the line 6—6 of Fig. 2.

Fig. 8 is a section taken on the line 8—8 of Fig. 3.

Fig. 9 is a section taken on the line 9—9 of Fig. 3.

Fig. 10 is a section taken on the line 10—10 of Fig. 9.

Fig. 11 is a section taken on the line 11—11 of Fig. 4.

Fig. 12 is an enlarged detail of the lower end of the pendulum of the invention.

Fig. 13 is a section taken on the line 13—13 of Fig. 12.

Fig. 15 is a section taken on the line 15—15 of Fig. 14.

Figs. 16 and 17 are diagrams showing the manner in which the amount and direction of deviation is calculated.

Fig. 18 is a view of a light recording member showing two readings taken in the apparatus of my invention.

Figure 3:
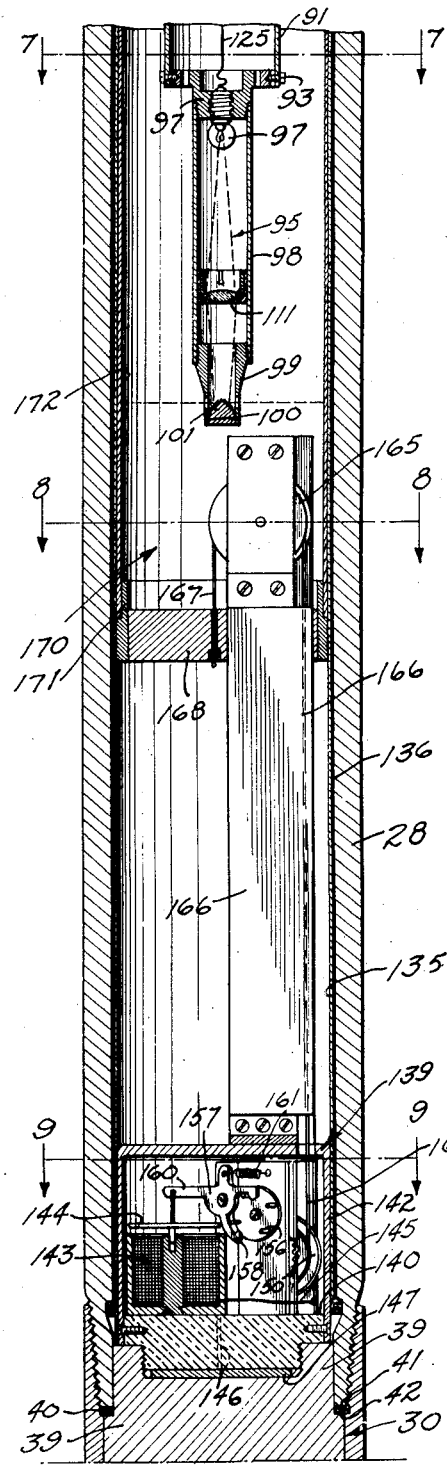
Fig. 3 is a section on the same scale as Fig. 2 showing the central part of the apparatus.
Figure 14:
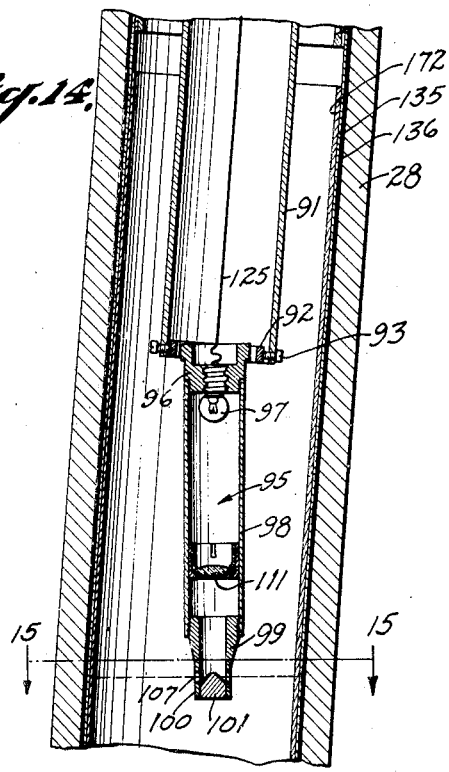
Fig. 14 is a view of the central portion of the apparatus showing the position of the pendulum when the apparatus is in a portion of a bore hole which is not vertical.

Referring to the drawings in detail, particularly to Fig. 1, the numeral 20 represents a well in which the bore hole survey device 21 of my invention is lowered by means of a cable 22. The cable 22 is attached to the survey device by means of a coupling member 23, as shown in Fig. 2. The cable 22 carries a pair of conductors 24 and 25, and the outer sheath 26 of the cable serves as a ground conductor. Referring particularly to Figs. 2, 3 and 4, the survey device 21 has an outer shell 28 to the upper end of which an upper head 29 is threadedly secured and to the lower end of which a lower head 30 is threadedly secured. Carried inside the upper end of the shell 28 and the upper head 29 is an upper block 31. Extending from the upper block 31 is a stem 32 to which the coupling member 23 is threadedly connected at 33. The upper block 31 provides a shoulder 34 and the upper end of the shell 28 provides a shoulder 35. Placed between the shoulders 34 and 35 is a gasket member 36. The upper block 31 is forced downward so as to compress the gasket member 36 and form a tight seal by means of screws 37 which are carried by the upper head 29. As shown in Fig. 3, the lower head 30 in the lower end of the shell 28 encloses a lower block 39. The lower block 39 has an annular shoulder 40, and the lower end of the shell 28 has an annular shoulder 41. Adapted to be compressed between these shoulders is a gasket member 42. Threaded into the lower end of the lower head 30 are screws 43 which are adapted to force the lower block 39 upward so as to compress the gasket member 42 and form a fluid-tight seal at this point.

Depending from the lower head 30 is a centralizing member 44. This centralizing member 44 has a body portion 45 which is secured to the lower head, as shown, this body portion 45 carrying spring arms 46 which are adapted to engage the walls of the casing 47 of the well 20. This structure centralizes the lower end of the survey device. The upper end of the survey device is centralized by an upper centralizing means shown at 48 in Fig. 1. This upper centralizing means is carried above the stem 32, having spring arms 50 which engage the inner walls of the well casing 47.

As illustrated best in Figs. 2, 5 and 6, the lower part of the upper block 31 has an upper bearing block 53 secured thereto by suitable pins 54. Attached to the upper bearing block 53 is a housing 54ª to the lower end of which a lower bearing plate 55 formed of insulation material is attached. This construction provides a gyroscope housing for the invention. The upper bearing block 53 carries an upper bearing 56 and the lower bearing block carries a lower bearing 58. Carried by the bearings 56 and 58 is a frame 59 which is free to rotate. The frame 59 has an upper trunnion 60 which engages the upper bearing 56 and a lower trunnion 61 which engages the lower bearing 58. In order that there be no vertical play between the frame 59 and the bearings, the upper trunnion 56 is provided with an adjustment nut 62 which may be screwed downward so as to increase the distance between the trunnions, thus eliminating any play which may exist. The frame 59, as shown in Fig. 5, carries pivots 64 which pivotally support a yoke 65. The yoke 65 carries a shaft 66 on which a stator 67 is secured. The shaft 66 carries bearings 68 on which a rotor 69 is free to rotate. The yoke 65, the stator 67, the frame 59, and the rotor 69 comprise the gyroscope of the invention. The details of this construction do not comprise a part of this invention and are therefore not illustrated in detail in this application.

The gyroscope is connected in an electricity supply circuit as follows: Extending through the upper block 31 and the stem 32 is a conductor rod 70 which is insulated from the other metal parts, as shown. The upper end of this conductor rod 70 is connected to the conductor 24 which extends through the cable 22. The lower end of the conductor rod 70 is provided with a suitable checking means 71 which is fluid-tight to prevent fluids from the well from reaching the interior of the apparatus. The lower end of this conductor rod 70 is connected by a wire 72 to a bushing 73 which is carried by an insulation plate 74, this insulation plate 74 being supported by the upper bearing block 53. Extending through the upper trunnion 60 of the frame 59 is a conductor rod 75, this conductor rod 75 being in electrical contact with the bushing 73 by a spring contact member 76. The conductor rod 75 is insulated from the upper trunnion 60, as shown. The conductor rod 75 is connected by a conductor 77 to one of the pivots 64, as shown in Figs. 2 and 5, which is insulated from the frame 59. A bearing 79 which is engaged by this insulated pivot is insulated from the yoke 65, as shown. Connected to this bearing 79 is a wire 80 which extends to one side of the winding of the stator 67. The other side of the stator winding is grounded to the yoke 65, as shown. The yoke 65 is in electrical contact with the upper bearing 56 and is consequently in electrical contact with the sheath 26 of the cable 22. At the surface of the ground, as shown in Fig. 1, the conductor 24 is connected to a suitable generator 80 which supplies current for operating the gyroscope. The current source 80 is in turn connected by a conductor 81 to the sheath 26, thus completing the electric circuit.

Figure 7:
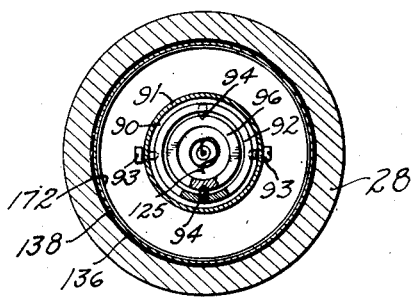
Fig. 7 is a section taken on the line 7—7 of Fig. 3.

It is essential that the gyroscope be very carefully balanced. In view of the fact that some of the material is cut away and replaced by insulation material which is lighter it is necessary to provide a balancing means. In the invention, as shown in Fig. 2, I show a balancing means comprising a cross-shaft 83 which is threaded and on which adjustable weights 84 are placed. These weights may be adjusted to various positions on the shaft 83. The lower trunnion 61 has a plate 90 formed on the lower end thereof below the lower bearing plate 55. This plate 90 comprises a part of a pendulum supporting means of the invention. This pendulum supporting means includes a tube 91 which is secured to the plate 90 and depends therefrom. The lower end of the tube 91 supports a yoke 92 by pivots 93. Supported from the yoke 92 by pivots 94, as shown in Fig. 7, is a pendulum 95 of the invention which is illustrated in Figs. 3, 7, 12, 13 and 14. The pendulum 95 has an upper member 96 which is engaged by the pivots 94 and which supports an illumination source in the form of a lamp 97. Extending downward from the part 96 is a shell or housing 98 at the lower end of which a mirror supporting member 99 is attached. The mirror supporting member 99 is shown in detail in Figs. 12 and 13. The extreme lower end thereof is in the form of a tubular projection 100 which supports a block 101. This block 101 carries deflecting means in the form of mirrors, there being a north mirror 103, an east mirror 104, a south mirror 105, and a west mirror 106. These mirrors 103 to 106 inclusive are disposed on planes at forty-five degrees to the central axis A—A of the pendulum 95. A ray of light passing parallel to the axis A—A will be deflected by the mirrors at right angles thereto. Adjacent to each mirror is an opening 107 in the tubular projection 100 through which the reflected light rays may pass. The north mirror 103 is distinguished from the other mirrors by having a central opaque portion 109 which will not reflect light. Supported in the shell 98 below the light source 97 is a lens 111 which focuses the light rays from the light source.

The light source 97 is connected to an electric circuit as follows: Referring to Fig. 2, a conductor rod 112 is extended through the upper block 31 and the stem 32 being insulated therefrom as shown. The upper end of this conductor rod 112 is connected to the lower end of the conductor 25 which extends through the cable 22. Surrounding the lower end of the conductor rod 112 is a suitable sealing means 113. Carried by the insulation plate 74 is a bushing 114 which is connected to the lower end of the conductor rod 112 by means of a conductor 115. The bushing 114 has a conductor 116 connected thereto, this conductor 116 extending downwardly to the lower side of the lower bearing plate 55. Secured to the lower face of the lower bearing plate 55 is a contact ring 118 to which the conductor 116 is connected. Carried by the lower bearing plate 55 is a resistance coil 120 which is provided for the purpose of reducing the current. The lower bearing plate 55 has a metallic member 121 connected thereto by screws 122. The metallic member 121 is electrically connected to the resistance coil 120 by means of a conductor 123, as shown in Fig. 2. The metallic member 121 of the lower bearing plate 55 is in electrical contact with the lower bearing 58, this lower bearing 58 being insulated from the lower trunnions 61 of the frame 59 and the plate 90. Connected to the bearing 58 and the lamp 97 is a conductor 125. The lamp 97 is in electrical contact with the metallic parts of the pendulum and pendulum support, and the pendulum support is in electrical contact with the frame 59. In this manner one side of this circuit is connected to the sheath 26. Referring to Fig. 1, the conductor 25 is connected to a suitable current source 127. The current source 127 is in turn connected to the sheath 26 by a conductor 128 having a switch 129. When the switch 129 is closed, this circuit is completed which illuminates the lamp 97.

Carried in the shell 28 below the gyroscope construction is a metallic conductor tube 135, the upper end of which surrounds the pendulum 95 and the pendulum support means, this conductor tube 135 being insulated from the shell 28 by an insulation wall 136. As shown in Fig. 2, the conductor tube 135 has contact fingers 137 which engage the contact ring 118, thus connecting the conductor tube in the electric circuit which includes the conductor 116. Referring to Fig. 3, at the lower end of the survey device is a film lowering control mechanism 139. This mechanism includes a plate 140 made of insulation material and threadedly secured to the lower block 30. Attached to the plate 140 is a housing 142 which encloses the mechanism. An electromagnet 143 having an associated armature 144 is supported by the plate 140. This electromagnet 143 is connected by a conductor 145 to the conductor tube 135. The electromagnet 143 is also connected by a conductor 146 to a plate 147 attached to the lower part of the insulation plate 140. In this manner the conductor 146 is grounded to the apparatus and is in electrical contact with the sheath 26 of the cable 22. It will be seen that the electromagnet is connected in the same main circuit with the lamp 97 and is energized whenever the switch 129 is closed. As shown best in Fig. 10, the housing 142 has a pair of webs 148 which carries a shaft 149 on which a drum 150 is rotatable. The drum 150 has a concentric gear 151 which is in mesh with a gear 152 carried by a shaft 153. Mounted on one end of the shaft 153 is an escapement wheel 155 having projections in the form of pins 156. Adapted to control the movement of the escapement wheel 155 is an escapement arm 157 having pawls 158. The escapement arm 157 has a lever 160 which is connected to the armature 144, as shown. A tension spring 161 is connected to the escapement arm 157 for resiliently retaining it in the position shown in the drawings. When the electromagnet is energized, the escapement arm is moved so that the upper pawl 158 is disengaged from one of the pins 156 and the lower pawl is moved into the path of the pins. This will allow the escapement wheel 155 to move a portion of a revolution. It should be understood that the operation of this escapement device is the same as the escapement in any clock mechanism. Wrapped on the drum 150 is a flexible member in the form of a cord 163. This cord 163 extends upward as shown in Fig. 3, and over a sheave 165 supported at the upper end of a vertical column 166. The upper end 167 of the cord 163 is connected to a lower head 168 of a light sensitive member carrier 170. Projecting upward from the head 168 is a tube 171 which carries a light sensitive member 172. This light sensitive member is tubular in form and surrounds the mirrors 103 to 106 inclusive. It will be seen that the weight of the light sensitive member carrier 170 tends to unwind the cord 163 from the drum 150. This places a rotative force on the escapement wheel 155 and whenever the escapement arm 157 is operated, these parts will rotate, allowing the cord to unwind and allowing the light sensitive member carrier 170 to lower a short distance. This is provided so that successive readings will be spaced a short distance on the light sensitive member 172.

In the operation of the invention the survey device 21 is lowered into the well, as shown in Fig. 1. In lowering the survey device the operator will keep an accurate check of the distance of the survey device below the surface of the ground. In other words, he must know the depth at which each successive reading is taken. In setting up the apparatus, the recording mechanism is disposed so that the mirror 109 points to the north, or, if desired, it may be arranged to point in any direction, but this direction must be known to the operator. The gyroscope maintains the azimuth of the recording mechanism. During the lowering of the device through the well the recording mechanism will not rotate with the other parts of the apparatus because of the gyroscope. A relative movement between these parts is provided for by the upper and lower bearings 56 and 58. It will, therefore, be seen that even though the shell of the survey apparatus rotates, the recording mechanism will be maintained in its original azimuth. The survey device is lowered to a point where it is desired to make a reading. At this time the switch 129 is closed which closes the circuits to the lamp 97 and to the electromagnet 143. The lamp 97 projects light rays through the lens 111 onto the four mirrors 103 to 106 inclusive. These mirrors separate the shaft of light and cast four separate images onto the light sensitive member 173. The energization of the electromagnet 143 operates the film lowering mechanism, and the film 173 will be lowered a short distance. This lowering is very sudden and will not have any detrimental effect on the images cast because it takes a few seconds for the image to be formed. Consequently, the light rays are focused for a period of time on the light sensitive member immediately after it has been lowered. The quick movement of the light sensitive member during the projection of the light rays may cause a slight streak, but this is not at all detrimental to the reading.

In Fig. 18 I show a light sensitive member in flat position which has two records thereon. The upper record 180 has been recorded when the apparatus was in vertical position. It will be seen that the dots 181 are equally spaced. The reading 182 was taken when the survey apparatus was in the position shown in Figs. 14 and 15. It will be seen that the four dots 183 are unequally spaced. The reason for this will be understood by referring to Fig. 15. The pendulum 95 at all times retains a vertical position. When the remainder of the apparatus moves out of vertical position the mirrors 103 to 106 move nearer to one side of the apparatus as is shown clearly in Fig. 15. The light rays are always directed horizontally at ninety degrees to each other, and in view of the fact that the light rays 185 from the mirrors 103 and 104 are shorter than the light rays 186 from the mirrors 105 and 106, the dots 183 formed on the film by the rays 185 will be closer together.

Referring to Figs. 16 and 17, the method by which the direction and amount of inclination of the well at a certain point is computed will be explained. Fig. 16 gives an example of computing the direction and amount of inclination when the pendulum is in the position shown in Figs. 14 and 15. Referring to this figure the values are as follows:

L = Effective length of pendulum
R = Radius of light sensitive member
N, E, S, and W = Four dots 183 made on film
D—D = Vertical plane of tilt
C = Angle between plane of tilt and north direction
A = Northerly component angle
$x_1$ = Circumference subtended by angle A
B = Easterly component angle
$y_1$ = Circumference subtended by angle B $$\text{Angle } A = \frac{x_1}{R} \times \frac{\pi}{180} \text{ degrees}$$

$$\text{Angle } B = \frac{y_1}{R} \times \frac{\pi}{180} \text{ degrees}$$

$$x = R \sin A$$
$$y = R \sin B$$

$$\text{Angle of inclination} = \sin^{-1} \sqrt{\frac{x^2 + y^2}{L}} = \sin^{-1} \frac{z}{L}$$

$$C = \tan^{-1} \frac{x}{y}.$$

In the diagrams the cardinal points 189 may be found by locating one-half the circumferential distance between alternate dots 183, that is $$\frac{W-E}{2} \text{ and } \frac{N-S}{2}.$$

When these cardinal points are located, the circumferential distances $x_1$ and $y_1$ may be which to compute the angle of inclination scaled off, thus giving the complete data by and also the angle C, these two being the important informations from which the angles of inclination and directions of inclination of the well throughout its length may be computed.

In the foregoing description I have illustrated but a preferred form of the invention. It should be understood that various modifications may be made without departing from the spirit and scope of the invention and it is my intention to cover all mechanical equivalents.

Certain apparatus disclosed in this application is specifically claimed in a co-pending application filed August 8, 1927, Serial No. 211,416.

I claim as my invention:

1. In a bore hole survey device, the combination of: a shell; blocks adapted to be secured to opposite ends of said shell; a gyroscope mounted on one of said blocks and removable therewith; a control mechanism mounted on the other of said blocks and removable therewith; a light-sensitive member adapted to be advanced by said control mechanism; and means carried by said gyroscope for exposing said light-sensitive member as a function of the position of said survey device.

2. In a bore hole survey device, the combination of: a shell; blocks adapted to be secured to opposite ends of said shell; a pendulum suspended in said shell below the upper of said blocks in a manner to be removable therewith; means for retaining a light-sensitive member in said shell, said member being adapted to record successive positions of the free end of said pendulum; and a control mechanism secured to the lower of said blocks for controlling the relative movement between said pendulum and said light-sensitive member between successive exposures.

3. In a bore hole survey device including means for exposing a fractional portion of a light-sensitive member as a function of the inclination of said survey device, the combination of: a shell; a carrier slidably retained in said shell and retaining said light-sensitive member; an escapement controlling the movement of said carrier and its associated light-sensitive member; and means for controlling said escapement.

4. In a bore hole survey device including means for exposing a fractional portion of a light-sensitive member as a function of the inclination of said survey device, the combination of: a shell; a carrier slidably retained in said shell and retaining said light-sensitive member; a sheave inside said shell; an escapement controlled driven means below said sheave and including an escapement; a flexible member operatively connecting said carrier and said escapement-controlled means and extending over said sheave whereby the weight of said carrier tends to operate said escapement-controlled means; and control means for said escapement.

5. A bore hole survey device comprising: a supporting structure adapted to be lowered into a well; a pendulum supported in said supporting structure; means whereby said pendulum is maintained at a fixed azimuth independent of said supporting structure; a recording medium cylindrically arranged in said supporting structure independent of said pendulum and said means; and mechanism for recording indicia on said recording medium as a function of the relative positions of said pendulum and said recording medium.

In testimony whereof, I have hereunto set my hand at Los Angeles, California, this 27th day of July, 1927.

WALTON E. GILBERT.

Certificate of Correction

Patent No. 1,912,768.  June 6, 1933.

WALTON E. GILBERT.

It is hereby certified that error appears in the printed specification of the above-numbered patent requiring correction as follows: Page 5, line 27, in the Angle $B$ formula for "$\frac{y^1}{R}$" read $\frac{y_1}{R}$; and that the said Letters Patent should be read with this correction therein that the same may conform to the record of the case in the Patent Office.

Signed and sealed this 11th day of July, A. D. 1933.

[SEAL.]

M. J. MOORE,
*Acting Commissioner of Patents.*